United States Patent
Yamaguchi et al.

(10) Patent No.: US 9,254,876 B2
(45) Date of Patent: Feb. 9, 2016

(54) APPARATUS FOR REDUCING VEHICLE AERODYNAMIC DRAG

(71) Applicant: HONDA MOTOR CO., LTD., Tokyo (JP)

(72) Inventors: Yoshihiro Yamaguchi, Wako (JP); Shinya Uno, Wako (JP); Haruo Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/463,084

(22) Filed: Aug. 19, 2014

(65) Prior Publication Data

US 2015/0054302 A1 Feb. 26, 2015

(30) Foreign Application Priority Data

Aug. 22, 2013 (JP) .................................. 2013-172207

(51) Int. Cl.
*B62D 35/00* (2006.01)
*B62D 37/02* (2006.01)
*F15D 1/00* (2006.01)

(52) U.S. Cl.
CPC ................ *B62D 37/02* (2013.01); *F15D 1/008* (2013.01)

(58) Field of Classification Search
CPC ................................ B62D 37/02; F15D 1/008
See application file for complete search history.

(56) References Cited

U.S. PATENT DOCUMENTS

| 3,529,862 A * | 9/1970 | Jousserandot ......... B62D 35/00 296/180.1 |
| 2009/0096248 A1 * | 4/2009 | Moscoso Gomez . B62D 35/007 296/180.1 |
| 2010/0026045 A1 * | 2/2010 | Thomas ............... B62D 35/007 296/180.1 |
| 2012/0066977 A1 * | 3/2012 | Sitzler ................... E05F 15/622 49/358 |

FOREIGN PATENT DOCUMENTS

EP 1 544 089 A1 6/2005

* cited by examiner

*Primary Examiner* — Lori L Lyjak
(74) *Attorney, Agent, or Firm* — Rankin, Hill & Clark LLP

(57) ABSTRACT

In an apparatus for reducing vehicle aerodynamic drag equipped with an air jet device installed at upper and lower positions of a rear of a vehicle and each having a vibrator connected to a diaphragm disposed in an enclosed region and adapted to be driven based on a drive signal to vibrate the diaphragm to jet/suck air through an orifice formed in the region, a vehicle traveling condition is detected, the drive signals for the respective air jet devices are determined independently of each other based on the detected traveling condition, and the vibrators of the respective air jet devices are driven based on the determined drive signals to reduce aerodynamic drag acting on the vehicle.

16 Claims, 5 Drawing Sheets

APPARATUS FOR REDUCING VEHICLE AERODYNAMIC DRAG

BACKGROUND OF THE INVENTION

1. Field of the Invention

This invention relates to an apparatus for reducing vehicle aerodynamic drag, more specifically to an apparatus that reduces the aerodynamic drag acting on a vehicle by using an air jet device to control airflow along the vehicle body.

2. Description of Related Art

One example of an apparatus that reduces vehicle aerodynamic drag by using an air jet device such as a synthetic jet actuator to control the airflow along the vehicle body is taught, for example, by European Laid-Open Patent Application No. 1 544 089. In the configuration according to the described technology, synthetic jet actuators having vibrating diaphragms disposed in cavities are installed at positions at least the upper and lower positions of the rear of the vehicle body, more specifically, at the upper, lower, right and left positions of the rear of the vehicle body or the like, and periodically drive the vibrating diaphragms to jet/suck air through slits, thereby suppressing separation of airflow generated on the vehicle body to reduce the aerodynamic drag acting on the vehicle.

BRIEF SUMMARY OF THE INVENTION

As described above, the technology of the reference is configured to install the synthetic jet actuators at the upper, lower, right and left positions of the rear of the vehicle body to jet/suck air through the slits of the actuators. However, unless speeds of the air jetted/sucked are appropriately controlled in the technology, trailing vortices (wake vortices) occurring at the rear of the vehicle body may sometimes be out of balance and it may be difficult to reduce the aerodynamic drag acting on the vehicle effectively.

Specifically, the bottom surface of the vehicle body is ordinarily rugged and the aerodynamic drag is therefore greater than that of the top surface, flow velocity of the airflow along the top surface of the vehicle body may be different from that flowing along the bottom surface. As a result, the trailing vortices occurring at the rear of the vehicle body could be out of balance, causing pressures at the upper and lower positions of the rear become different from each other. This will be a factor to increase the aerodynamic drag.

The object of embodiments of this invention is therefore to solve the aforesaid problem by providing an apparatus for reducing vehicle aerodynamic drag which reduces aerodynamic drag acting on a vehicle body effectively by using an air jet device.

In order to achieve the object, this invention provides in its first aspect an apparatus for reducing vehicle aerodynamic drag equipped with air jet devices installed at positions including at least upper and lower positions of a rear of a vehicle of an almost box-like shape and each having a vibrator connected to a diaphragm disposed in an enclosed region and adapted to be driven based on a drive signal to vibrate the diaphragm to jet/suck air through an orifice formed in the enclosed region, comprising: a vehicle traveling condition detector that detects a traveling condition of the vehicle; a drive signal determiner that determines the drive signals for the respective air jet devices independently of each other in terms of at least one of frequency and magnitude based on the detected traveling condition of the vehicle; and a vibrator driver that drives the vibrators of the respective air jet devices based on the determined drive signals to vibrate the diaphragms to jet/suck air through the orifices to reduce aerodynamic drag acting on the vehicle.

In order to achieve the object, this invention provides in its second aspect a method for reducing vehicle aerodynamic drag equipped with air jet devices installed at positions including at least upper and lower positions of a rear of a vehicle of an almost box-like shape and each having a vibrator connected to a diaphragm disposed in an enclosed region and adapted to be driven by a drive signal to vibrate the diaphragm to jet/suck air through an orifice formed in the enclosed region, comprising the steps of: detecting a traveling condition of the vehicle; determining the drive signals for the respective air jet devices independently of each other in terms of at least one of frequency and magnitude based on the detected traveling condition of the vehicle; and driving the vibrators of the respective air jet devices by the determined drive signals to vibrate the diaphragms to jet/suck air through the orifices to reduce aerodynamic drag acting on the vehicle.

DETAILED DESCRIPTION OF THE INVENTION

Embodiments for implementing the apparatus for reducing vehicle aerodynamic drag according to this invention will be explained with reference to the attached drawings in the following.

Figure 1:
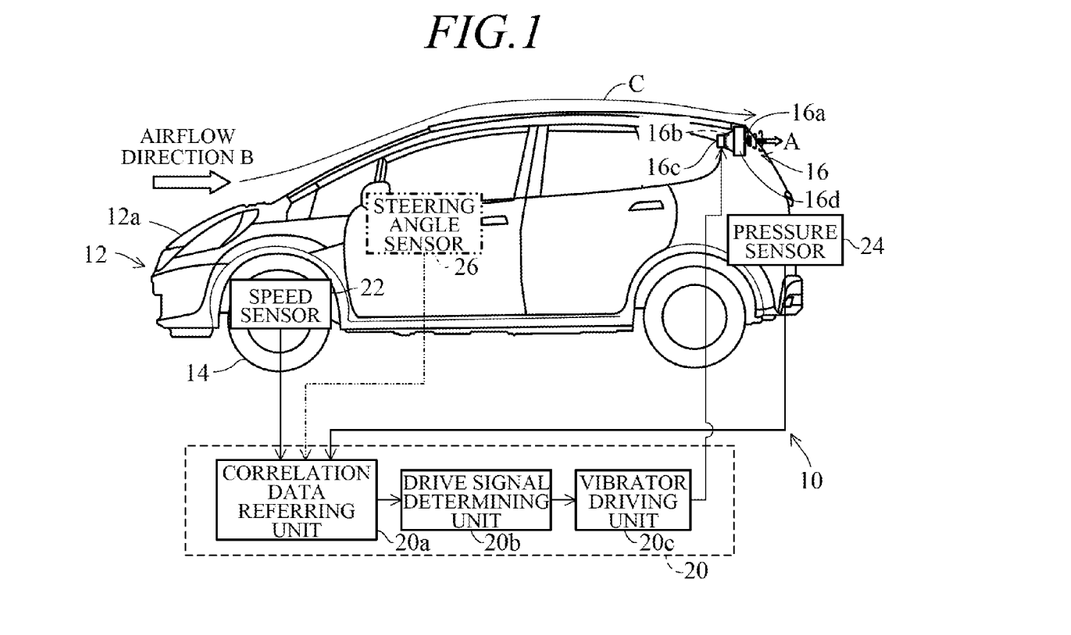
FIG. 1 is an overall schematic diagram showing the apparatus for reducing vehicle aerodynamic drag according to a first embodiment of this invention.

FIG. 1 is an overall schematic diagram showing the apparatus for reducing vehicle aerodynamic drag according to a first embodiment of this invention.

The apparatus is designated by symbol 10 in FIG. 1. The apparatus 10 is equipped with a plurality of synthetic jet actuators (air jet device) 16 that are mounted on a body 12a of a vehicle 12. The actuator 16 is hereinafter called "SJ actuator". For convenience of understanding, only one actuator 16 is shown in the figure. In the figure, the size of the SJ actuator 16 is exaggerated for clarity.

The vehicle 12 is a passenger car of an almost box-like shape such as the hatchback type as shown in the figure. A prime mover (motor; not shown) that comprises of an internal combustion engine, an electric motor or a hybrid thereof is installed in the front end of the vehicle body 12a. The driving force of the prime mover is applied to driven wheels 14 to propel the vehicle 12.

The SJ actuators 16 are all mounted inside a luggage compartment (not shown) at the rear end of the vehicle body 12a.

Specifically, the SJ actuators 16 are mounted at the rear (back) end of the vehicle body 12a at positions including at least upper and lower positions, specifically at upper, lower, right and left positions in the direction of gravity and viewed from the driver's seat.

More specifically, the SJ actuators 16 are mounted at an upper position of a rear window, at a lower position of a rear bumper, and at positions in the vicinity of right and left tail lamps of the rear end of the vehicle body 12a. An orifice (slit) 16a is each formed (opened) at the respective positions where the SJ actuators 16 are installed.

The SJ actuator 16 are of a known structure such as a speaker, each includes a vibrating diaphragm (vibrating membrane) 16b, a vibrator (magnetic circuit unit) 16c connected to the diaphragm 16b and made of a magnet or the like, and an enclosed region (cavity) 16d.

At least one (preferably, several) SJ actuator 16 is installed at each of the upper position (side), lower position (side), right position (side) and left position (side) of the rear end of the vehicle body 12a. The SJ actuators 16 are installed at the rear end of the vehicle body 12a in such a manner that they can be controlled independently of and separately from each other.

As illustrated, all the orifices 16a of the SJ actuators 16 formed at the rear end of the vehicle body 12a are oriented to direct the jetting direction A of air jetted therefrom parallel to the flow direction B of airflow along the vehicle body 12a when the vehicle 12 travels, and are positioned in the vicinity of the separation point of the boundary layer formed on the wall surface of the vehicle body 12a by airflow C.

It should be noted here that the position of the separation point is suitably estimated (measured) through experimentation beforehand with consideration to the shape of the vehicle body 12a and the assumed traveling speed of the vehicle 12.

An ECU (Electronic Control Unit) 20 incorporating a microcomputer comprising a CPU, ROM, RAM, I/O and other components is installed near the driver's seat or at some other convenient location in the vehicle 12.

A speed sensor (detector) 22 is installed near the driveshaft (not shown) of the driven wheels 14 and outputs a pulse signal indicating the traveling speed of the vehicle 12 (i.e., vehicle speed) to the ECU 20.

The ECU 20 has a correlation data referring unit 20a, a drive frequency determining unit (drive signal determiner) 20b and a vibrator driving unit (vibrator driver) 20c. The correlation data referring unit 20a and drive frequency determining unit 20b determine a drive signal in terms of drive frequency and amplitude to be applied to the vibrator 16c of the SJ actuator 16 based on the detected traveling speed of the vehicle 12, and the vibrator driving unit 20c drives the vibrator 16c based on the determined drive signal, i.e., the determined frequency and amplitude. The vibrator driving unit 20c has an amplifier.

The foregoing operation of the ECU 20 will be explained with reference to FIGS. 2 and 3.

Figure 2:
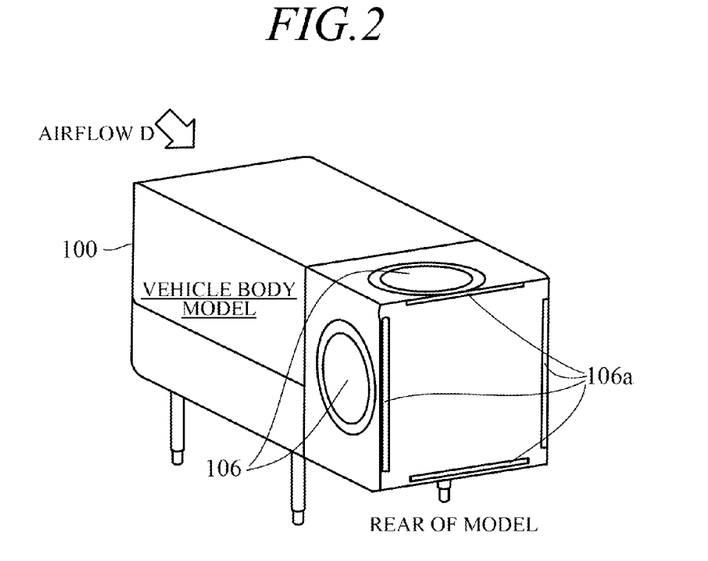
FIG. 2 is an explanatory diagram of a test unit for verifying the effect of the apparatus of FIG. 1.

FIG. 2 is an explanatory diagram of a test unit 100 used to verify the effect of the apparatus 10 of FIG. 1, and FIG. 3 is a set of graphs showing results of experiments conducted using the test unit 100 shown in FIG. 2.

The test unit 100 is a vehicle body model of the body 12a of the vehicle 12. It is placed inside a wind tunnel (not shown) and exposed to air blown in direction of arrow D. The test unit 100 has four vibrating air sources (corresponding to the SJ actuators 16) 106 installed inside at upper, lower, right and left positions. The four vibrating sources 106 are each formed (opened) with orifice (slit) 106a at the surface of the rear end (corresponding to the vehicle rear end) in the airflow.

Figure 3A:
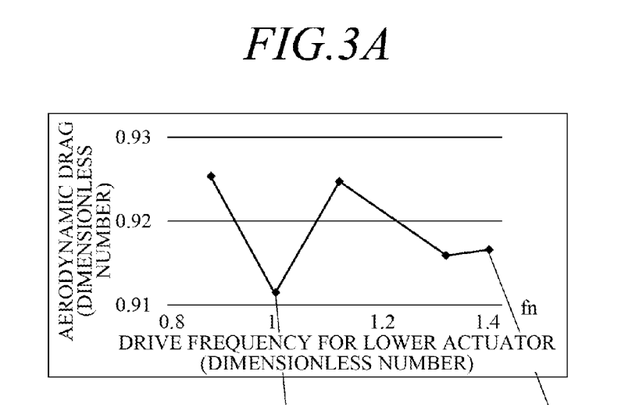
FIGS. 3A-3D are graphs showing results of experiments conducted using the test unit shown in FIG. 2.

FIG. 3A shows characteristics of aerodynamic drag (more precisely aerodynamic drag reducing rate) relative to the drive frequency of the lower vibrating air source 106 (installed in the test unit 100 at the lower position) among the four vibrating air sources 106.

In FIGS. 3A to 3D, the drive frequency is expressed by a dimensionless number fn where a reference frequency is indicated as 1. The aerodynamic drag is also expressed by a dimensionless number where the aerodynamic drag at the time the lower vibrating air source 106 is not driven is indicated as 1.

Figure 3B:
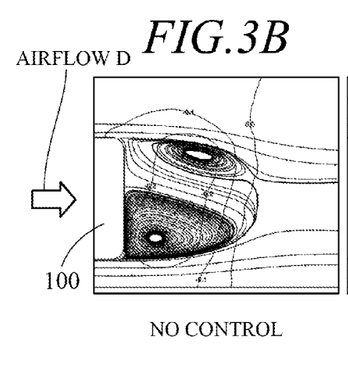
Figure 3C:
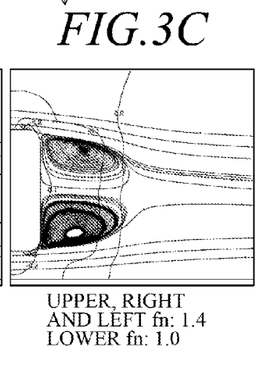
Figure 3D:
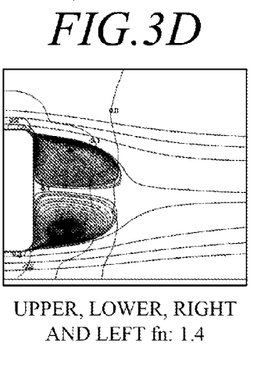

FIGS. 3B to 3D show pressure distribution of the air (trailing vortices) when viewed the test unit 100 from the side, in which FIG. 3B shows pressure distribution when the four vibrating air sources 106 including the lower one are not driven (not controlled), FIGS. 3C and 3D show pressure distribution when the four vibrating air sources 106 are driven (controlled) to be vibrated at specific frequencies as indicated by arrows from FIG. 3A.

As will be understood from FIG. 3B, when the four vibrating air sources 106 are not driven, the trailing vortices (indicating pressure distribution) occurring at the four positions, in particular at the upper and lower positions of the rear (in the airflow) of the test unit 100 do not balance and the vortex occurring at the lower position grows stronger so that the aerodynamic drag increases accordingly.

On the contrary, as shown in FIGS. 3C and 3D, when the four vibrating air sources 106 are driven (controlled) to be vibrated appropriately, it becomes possible to keep the trailing vortices occurring at the rear of the test unit 100 in balance and reduce the aerodynamic drag.

Specifically, as shown in FIG. 3C, when the four vibrating air sources 106 are driven independently (e.g. driven at the drive frequency fn of 1.4 for the upper and right and left ones and at the drive frequency fn of 1.0 for the lower one), it becomes possible to reduce the aerodynamic drag more effectively than a case shown in FIG. 3D in which the four vibrating air sources 106 are driven at the same drive frequency fn of 1.4.

What is a unique and distinctive characteristic of this embodiment is, based on the findings obtained from the aforesaid tests, the SJ actuators 16 installed at the positions including at least the upper and lower positions, more specifically installed at the upper, lower, right and left positions of the rear of the vehicle body 12a are driven independently, so that it becomes possible to control the airflow C (the boundary layer formed on the wall surface of the vehicle body 12a) so as to shift the separation point downstream (i.e., to suppress the separation of the airflow C formed on the wall surface of the vehicle body 12 when the vehicle 12 travels) and to control the trailing vortices occurring at the upper, lower, right and left positions of the rear of the vehicle body 12a, more specifically to keep them in balance, thereby reducing the aerodynamic drag acting on the vehicle body 12a.

Figure 4:
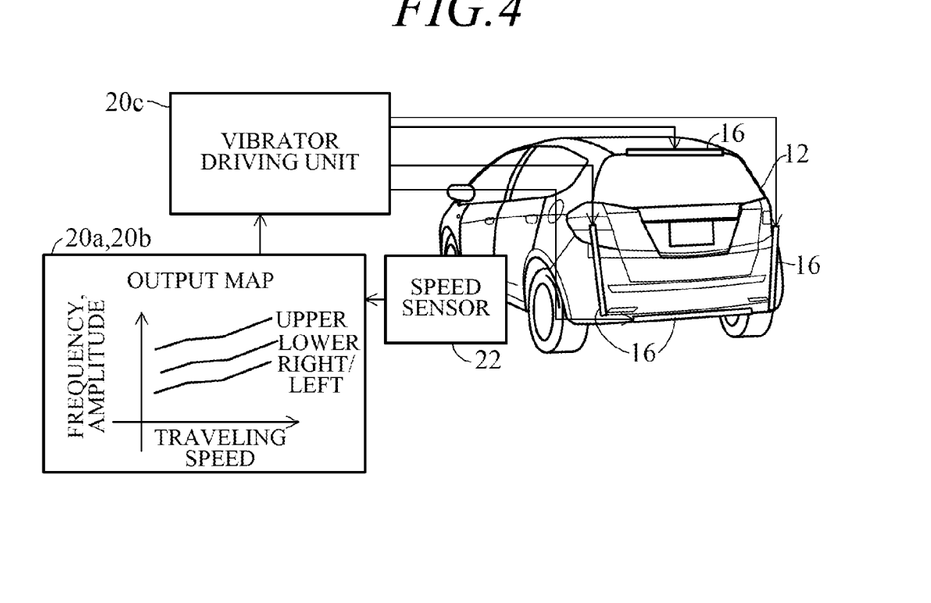
FIG. 4 is an explanatory diagram showing the operation of the apparatus of FIG. 1.
Figure 5:
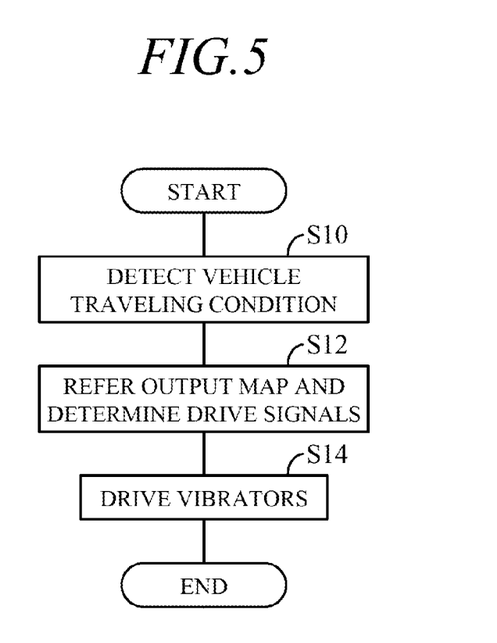
FIG. 5 is a flowchart showing the operation of the apparatus of FIG. 1 in detail.

FIG. 4 is an explanatory diagram showing the operation of the apparatus of FIG. 1, and FIG. 5 is a flowchart showing the operation of the apparatus of FIG. 1 in detail. The program of FIG. 5 is executed in the ECU 20 at every predetermined intervals.

Explaining this, the program starts at S10, in which traveling condition of the vehicle 12, specifically the traveling speed of the vehicle 12 is detected based on the output of the speed sensor 22 shown in FIGS. 1 and 4.

The program proceeds to S12, in which an output map (first characteristics) stored in the correlation data referring unit 20a is retrieved based on the traveling speed detected at S10 and in accordance with the result of retrieval, the drive signal, i.e., either of the drive frequency and amplitude for each vibrator 16c of the SJ actuators 16 installed at the upper, lower, right and left positions of the rear of the vehicle body 12a, specifically both of the drive frequency and amplitude of each vibrator 16c of the SJ actuators 16 are determined.

The operation in S12 is conducted by the correlation data referring unit 20a and drive frequency determining unit 20b illustrated in FIG. 1. The output map ((first characteristics) and other characteristics mentioned below) stored in the correlation data referring unit 20a are all prepared through experimentation beforehand.

The program then proceeds to S14, in which each vibrator 16c of the SJ actuators 16 installed at the upper, lower, right and left positions of the rear of the vehicle body 12a is driven based on the drive signal, i.e., is driven at the drive frequency and amplitude determined in S12 independently and separately. The operation in S14 is conducted by the vibrator driving unit 20c.

Since the apparatus for reducing vehicle aerodynamic drag according to the first embodiment is configured in the foregoing manner, it becomes possible to suppress the separation of the airflow C formed on the wall surface of the vehicle body 12a when the vehicle 12 travels, and to control the trailing vortices occurring at the upper, lower, right and left positions of the rear of the vehicle body 12a, more specifically to keep them in good balance, thereby reducing the aerodynamic drag acting on the vehicle body 12a.

Specifically, the apparatus is configured such that it retrieves the first characteristics (output map shown in FIG. 4) based on the traveling speed of the vehicle 12 detected by the speed sensor 22 for each of the SJ actuators 16 installed at positions including at least the upper and lower positions, to determine the drive signals (controlled variables) that are independent of and separate from each other for the actuators 16 (by the correlation data referring unit 20a and drive frequency determining unit 20b and the processing in S12), and to drive each vibrator 16c of the actuators 16 accordingly (by the vibrator driving unit 20c and the processing in S14). With this, it becomes possible to control the trailing vortices in such a manner that they are kept in good balance.

Figure 6:
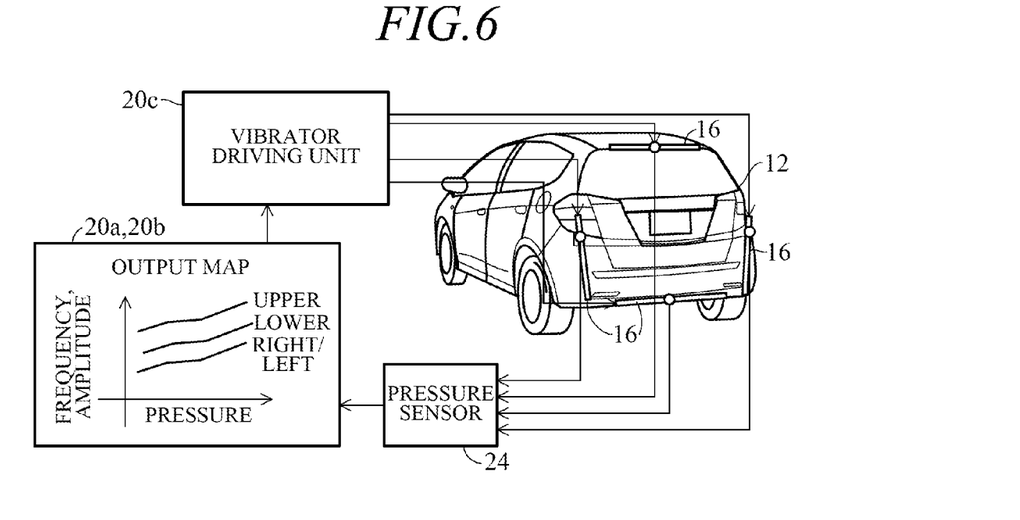
FIG. 6 is an explanatory diagram, similar to FIG. 4, but showing an alteration of the apparatus of FIG. 1.

FIG. 6 is an explanatory diagram, similar to FIG. 4, but showing an alteration of the apparatus of FIG. 1.

The alteration is configured to have pressure sensors (detectors) 24 at positions including at least the upper and lower positions, more specifically at the upper, lower, right and left positions of the rear of the vehicle body 12a, to retrieve an output map (second characteristics; shown in the figure) preset beforehand and stored in the correlation data referring unit 20a based on the air pressures at the respective positions detected by the pressure sensors 24 (instead of the traveling speed detected by the speed sensor 22), and to determine the drive signal in either of the drive frequency and amplitude, more specifically in both of the drive frequency and amplitude.

It should be noted here that the pressure sensors 24 are installed at locations where the trailing vortices (occurring at the rear of the vehicle body 12a when the airflow C along the vehicle body 12a is controlled) can be detected appropriately.

Specifically, they are installed at locations in the vicinity of the orifices 16a (shown in FIG. 1), more precisely, at locations that are inner (closer to the center line of the rear end of the vehicle body 12a) than those of the orifices 16a, so as not to be directly affected by the air jetting from the orifice 16a. The outputs of the pressure sensors 24 are processed appropriately by a high-pass filter, etc.

Since the alternation of the first embodiment is configured in the foregoing manner, it becomes possible to suppress the separation of the airflow C formed on the wall surface of the vehicle body 12a when the vehicle 12 travels, and to control the trailing vortices occurring at the upper, lower, right and left positions of the rear of the vehicle body 12a, more specifically to keep them in good balance, thereby reducing the aerodynamic drag acting on the vehicle body 12a, as mentioned with reference to FIGS. 4 and 5.

Specifically, the apparatus is configured such that it retrieves the second characteristics (output map shown in FIG. 6) based on the air pressures detected by the pressure sensors 24, to determine the drive signals (controlled variables) that are independent of and separate from each other for the SJ actuators 16 installed at the positions including at least the upper and lower positions of the respective positions of the vehicle 12 (by the correlation data referring unit 20a and drive frequency determining unit 20b and the processing in S12), and to drive the vibrator 16c of the actuators 16 based on the determined drive signals (by the vibrator driving unit 20c and the processing in S14). With this, it becomes possible to control the trailing vortices to keep them in good balance.

A second embodiment for implementing the apparatus for reducing vehicle aerodynamic drag according to this invention will next be explained.

Figure 7:
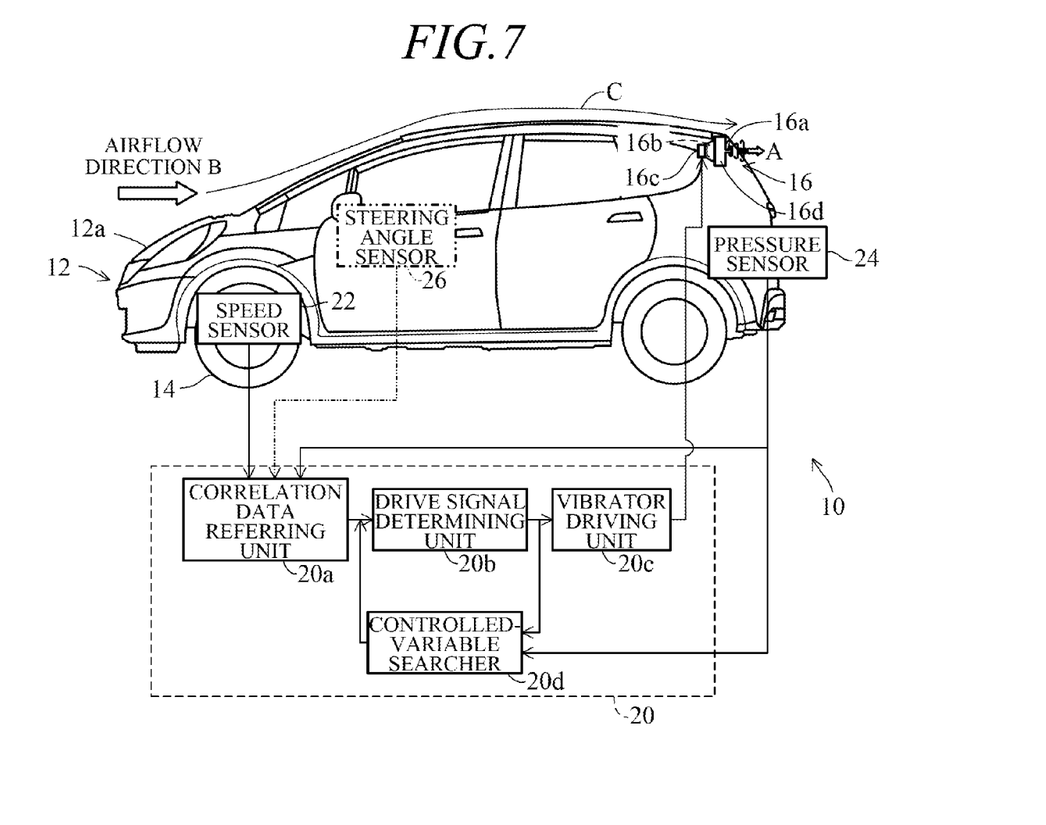
FIG. 7 is an overall schematic diagram showing the apparatus for reducing vehicle aerodynamic drag according to a second embodiment of this invention.
Figure 8:
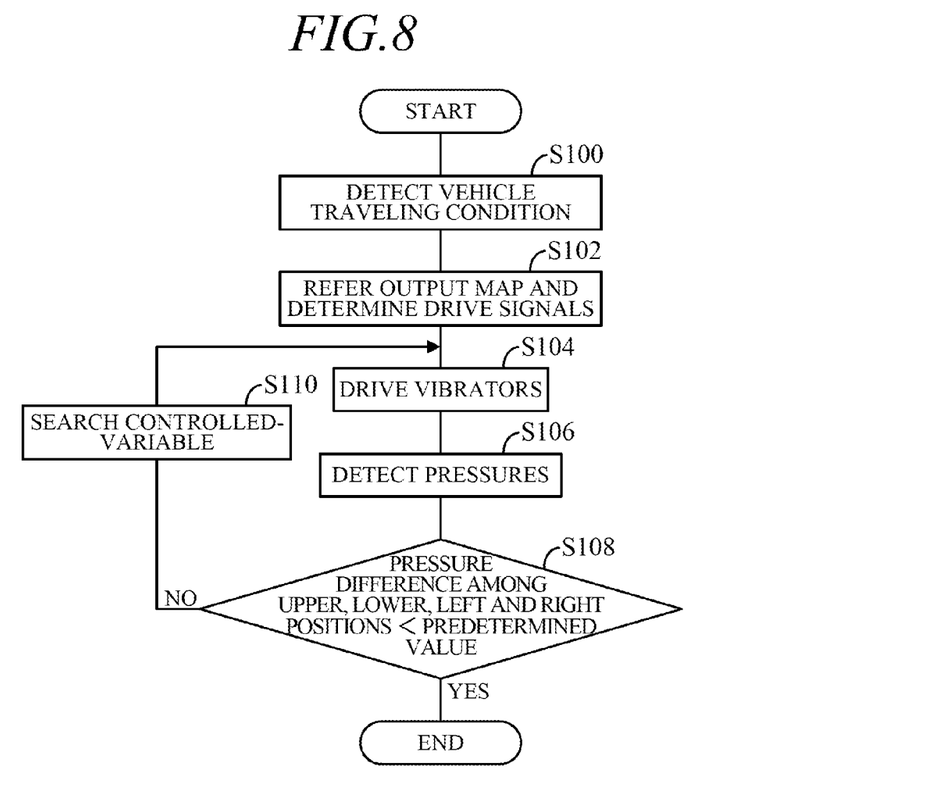
FIG. 8 is a flowchart showing the operation of the apparatus of FIG. 7.
Figure 9:
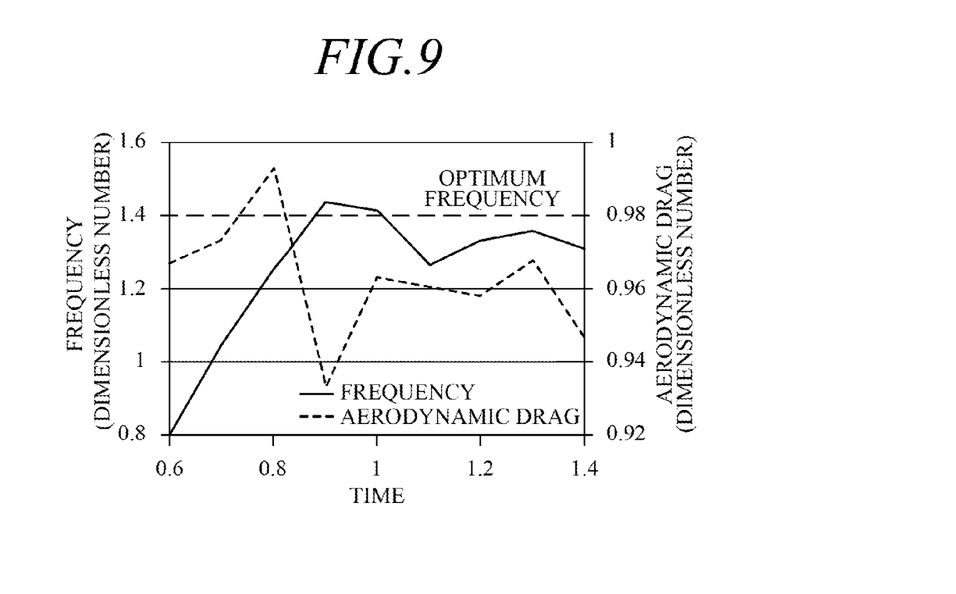
FIG. 9 is an explanatory diagram showing effects of the operation shown in FIG. 8.

FIG. 7 is an overall schematic diagram showing the apparatus for reducing vehicle aerodynamic drag according to the second embodiment of this invention, FIG. 8 is a flowchart showing the operation of the apparatus of FIG. 7, and FIG. 9 is an explanatory diagram showing effects of the operation shown in FIG. 8.

Explaining this with focus on the differences from the first embodiment, in the apparatus according to the second embodiment, the ECU is configured to have a controlled-variable searcher (corrector) 20d.

The controlled-variable searcher 20d searches for (calculates) a correction term to correct the drive signal (drive frequency and amplitude; controlled variable to be applied to the vibrator 16c) based on the drive signal and the pressure detected by the pressure sensors 24.

Explaining this with reference to the flowchart of FIG. 8, the program starts at S100 and proceeds, via S102, to S104, in which the same processing as that of S10 to S14 of the flowchart of FIG. 4 in the first embodiment, and then proceeds to S106, in which the pressures at the rear of the vehicle body 12a are detected based on the outputs of the pressure sensors 24.

Specifically, in S106, the pressures at positions including at least the upper and lower positions, more precisely the upper, lower, right and left positions of the rear of the vehicle body 12a are detected at a time when (to be precise, shortly after) the vibrators 16c of the SJ actuators 16 have been driven independently in S104 by the drive signals determined in S102.

The program then proceeds to S108, in which a difference among the pressures of the rear of the vehicle body 12a detected in S106 is calculated and the calculated difference is compared with a predetermined value to determine whether the difference is less than the predetermined value.

More specifically, a difference between the pressures detected at the upper and lower positions of the rear of the vehicle body 12a and a difference between the pressures detected at the right and left positions are calculated and it is determined whether each of the calculated differences is less than the predetermined value.

When the result in S108 is affirmative, since it can be determined that the pressures (trailing vortices) occurred at the rear of the vehicle body 12a after the vibrators 16c have been driven by the drive signals retrieved from the output map (any one of the first to fourth characteristics: third and fourth characteristics are explained later) are kept in balance, the program is terminated.

On the other hand, when the result in S108 is negative and it is determined that the pressures occurred at the rear of the vehicle body 12a after the vibrators 16c have been driven by the drive signals retrieved from the output map are not kept in balance, the program proceeds to S110, in which the correction term to correct the drive signal(s) to be applied to the vibrators 16c is searched (calculated) based on the difference (s) in the controlled-variable searcher 20d.

Here, outlining the processing from S106 to S110, it amounts for comparing a difference among the detected pressures with each other and corrects the drive signals for the respective air jet devices 16 based on a result of comparison.

It should be noted that the searching of the correction term can be made using known feedback control laws, etc.

FIG. 9 shows the effects of the operation of the second embodiment shown in FIG. 8, using the test unit 100 illustrated in FIG. 2.

In the figure, the shown frequency is a value obtained by making the drive frequency applied to the upper vibrating air source 106 as a dimensionless frequency, i.e., a value similar to the aforesaid dimensionless frequency fn.

From the figure, it can be understood that the drive frequency of the vibrating air source 106 is converged on an optimum frequency by the control of the flowchart of FIG. 8.

As explained above, the apparatus for reducing vehicle aerodynamic drag according to the second embodiment is configured to compare the pressures detected after the vibrators 16c of the SJ actuators 16 have been driven based on the drive signals with each other, and in accordance with the result of the comparison, to correct the drive signals (in drive frequency and amplitude) to be applied to the vibrators 16c determined from the output map.

With this, it becomes possible to determine the drive signals more precisely and to reduce the aerodynamic drag acting on the vehicle body 12a more effectively. The remaining effects and advantages are the same as those of the first embodiment.

It should be noted in the above that, as shown in phantom lines in FIGS. 1 and 7, it is possible to further install a steering angle sensor (detector) 26 at a shaft of the steering wheel (not shown) provided at the driver's seat of the vehicle 12 that produces an output indicating the steering angle of the steering wheel manipulated by the driver, and to store an output map (third characteristics; not shown) in the correlation data referring unit 20a beforehand that is retrieved from the vehicle traveling condition including the traveling speed and steering angle of the steering wheel.

Alternatively, it is possible to store an output map (fourth characteristics; not shown) in the correlation data referring unit 20a beforehand that is retrieved from the vehicle traveling condition including the air pressures at the rear of the vehicle body 12a and steering angle of the steering wheel.

With this, it becomes possible to determine the drive signals to be applied to the SJ actuators 16 installed at the upper, lower, right and left positions, in particular those installed at the right and left positions precisely in accordance with the detected steering angle, thereby reducing the aerodynamic drag acting on the vehicle body 12a more effectively.

Explaining this more specifically, since the vehicle body 12a is ordinarily given an almost bilateral symmetry, insofar as the vehicle 12 travels straight, the trailing vortices occurring at the right and left positions of the rear of the vehicle body 12a are kept in balance and hence, almost no pressure difference can be found. However, when the vehicle 12 is turning, the trailing vortices occurring at the right and left positions may lose their balance and as a result, the pressure difference may be found and the aerodynamic drag may be increased.

However, with the configuration mentioned above, it becomes possible to determine the drive signals to be applied to the SJ actuators 16 installed at the upper, lower, right and left positions, in particular those installed at the right and left positions precisely in accordance with the detected steering angle, thereby reducing the aerodynamic drag acting on the vehicle body 12a more effectively.

As stated above, the first and second embodiments of this invention are configured to have an apparatus (10) and method for reducing vehicle aerodynamic drag equipped with air jet devices (16) installed at positions including at least upper and lower positions of a rear of a vehicle (12) of an almost box-like shape and each having a vibrator (16c) connected to a diaphragm (16b) disposed in an enclosed region (16d) and adapted to be driven based on a drive signal to vibrate the diaphragm (16b) to jet/suck air through an orifice (16a) formed in the enclosed region (16d), characterized by: a vehicle traveling condition detector (20, 22, 24, 26, S10, S100) that detects a traveling condition of the vehicle; a drive signal determiner (20a, 20b, S12, S102) that determines the drive signals for the respective air jet devices (16) independently of each other in terms of at least one of frequency and magnitude based on the detected traveling condition of the vehicle; and a vibrator driver (20, S14, S104) that drives the vibrators (16c) of the respective air jet devices (16) based on the determined drive signals to vibrate the diaphragms (16b) to jet/suck air through the orifices (16a) to reduce aerodynamic drag acting on the vehicle.

With this, it becomes possible to suppress the separation of the airflow C formed on the wall surface of the vehicle body 12a when the vehicle 12 travels and to control the trailing vortices occurring at the upper, lower, right and left positions of the rear of the vehicle body 12a, more specifically to keep them in good balance, thereby reducing the aerodynamic drag acting on the vehicle body 12a.

Specifically, since the apparatus and method are configured to determine the drive signals (controlled variables) that are independent of and separate from each other for the SJ actuators 16, and to drive each vibrator 16c of the SJ actuators 16, it becomes possible to control the trailing vortices in such a manner that they are kept in good balance.

In the apparatus and method, the vehicle traveling condition detector has a speed detector (22) that detects a traveling speed of the vehicle, and the drive signal determiner determines the drive signals for the respective air jet devices (16) by retrieving characteristics (first characteristics) preset beforehand based on the detected traveling speed.

With this, since the apparatus and method are configured such that it retrieves the first characteristics (output map shown in FIG. 4) based on the traveling speed of the vehicle 12 detected by the speed sensor 22 for each of the SJ actuators 16 installed at positions including at least the upper and lower positions, to determine the drive signals (controlled variables) that are independent of and separate from each other for the actuators 16, and to drive each vibrator 16c of the actuators 16, it becomes possible to control the trailing vortices in such a manner that they are kept in good balance.

In the apparatus and method, the vehicle traveling condition detector has a pressure detector (22) that detects a pressure of air at positions including at least the upper and lower positions of the rear of the vehicle (12), and the drive signal determiner determines the drive signals for the respective air jet devices (16) by retrieving characteristics (second characteristics) preset beforehand based on the detected pressure.

With this, since the apparatus and method are configured such that it retrieves the second characteristics based on the air pressures detected by the pressure sensors for the SJ actuators 16 installed at positions including at least the upper and lower positions of the respective positions of the vehicle 12, to determine the drive signal that are independent of and separate from each other for the actuators 16, and to drive the vibrator 16c of each of the actuators 16, it becomes possible to control the trailing vortices to keep them in good balance.

In the apparatus and method, the air jet devices (16) are installed at positions including upper, lower, right and left positions of the rear of the vehicle, and the vehicle traveling condition detector has a steering angle detector that detects a steering angle of a steering wheel provided at a driver's seat of the vehicle, and the drive signal determiner determines the drive signals for the respective air jet devices (16) by retrieving characteristics (third characteristics) preset beforehand based on the detected traveling speed and the detected steering angle.

With this, it becomes possible to determine the drive signals to be applied to the SJ actuators 16 installed at the upper, lower, right and left positions, in particular those installed at the right and left positions precisely in accordance with the detected steering angle and to reduce the aerodynamic drag acting on the vehicle body 12a more effectively.

In the apparatus and method, the air jet devices (16) are installed at positions including upper, lower, right and left positions of the rear of the vehicle, the vehicle traveling condition detector has a steering angle detector that detects a steering angle of a steering wheel provided at a driver's seat of the vehicle, and the drive signal determiner determines the drive signals for the respective air jet devices (16) by retrieving characteristics (fourth characteristics) preset beforehand based on the detected pressure and the detected steering angle.

Specifically, since the vehicle body 12a is ordinarily given an almost bilateral symmetry, insofar as the vehicle 12 travels straight, the trailing vortices occurring at the right and left positions of the rear of the vehicle body 12a are kept in balance and hence, almost no pressure difference can be found. In contrary, when the vehicle 12 is turning, the trailing vortices occurring at the right and left positions may lose balance and as a result, the pressure difference may be found and the aerodynamic drag may be increased.

However, with the configuration mentioned above, it becomes possible to determine the drive signals to be applied to the SJ actuators 16 installed at the upper, lower, right and left positions, in particular those installed at the right and left positions precisely in accordance with the detected steering angle, thereby reducing the aerodynamic drag acting on the vehicle body 12a more effectively.

In the apparatus and method, vehicle traveling condition detector has a pressure detector (22) that detects a pressure of air at positions including at least the upper and lower positions of the rear of the vehicle, and the drive signal determiner includes a corrector (20, 20d, S108, S110) that compares the detected pressures with each other and corrects the drive signals for the respective air jet devices (16) based on a result of comparison.

Specifically, in the apparatus and method, the pressure detector (22) detects the pressure of air after the vibrators (16c) of the respective air jet devices (16) have been driven by the determined drive signals.

With this, since the apparatus and method are configured to compare the pressures detected by the pressure sensors 24 with each other and based on the result of comparison, to correct the drive signals to be applied to the vibrators 16c determined from the output map (any one of the first to fourth characteristics), it becomes possible to determine the drive signals more precisely and to reduce the aerodynamic drag acting on the vehicle body 12a more effectively.

In the apparatus and method, the corrector compares a difference among the detected pressures with a predetermined value and corrects the drive signals for the respective air jet devices (16) based on a result of comparison. With this, it becomes possible to determine the drive signals more precisely, thereby reducing the aerodynamic drag acting on the vehicle body 12a more effectively.

Although the foregoing description assumes that speaker diaphragms are used as the diaphragms (vibrating membranes) of the SJ actuator, piezoelectric diaphragms (vibrating membranes) can be adopted instead.

Although the embodiment was explained taking a hatchback passenger car as an example of the vehicle 12, the vehicle is not limited to this shape and the vehicle can instead be, for example, a sedan, minivan or other model passenger car.

Japanese Patent Application No. 2013-172207, filed on Aug. 22, 2013, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for reducing vehicle aerodynamic drag equipped with air jet devices installed at positions including at least upper and lower positions of a rear of a vehicle of an almost box-like shape and each having a vibrator connected to a diaphragm disposed in an enclosed region and adapted to be driven based on a drive signal to vibrate the diaphragm to jet/suck air through an orifice formed in the enclosed region, comprising:

a vehicle traveling condition detector that detects a traveling condition of the vehicle;

a drive signal determiner that determines the drive signals for the respective air jet devices independently of each other in terms of at least one of frequency and magnitude based on the detected traveling condition of the vehicle; and a vibrator driver that drives the vibrators of the respective air jet devices based on the determined drive signals to vibrate the diaphragms to jet/suck air through the orifices to reduce aerodynamic drag acting on the vehicle.

2. The apparatus according to claim 1, wherein the vehicle traveling condition detector has a speed detector that detects a traveling speed of the vehicle, and the drive signal determiner determines the drive signals for the respective air jet devices by retrieving characteristics preset beforehand based on the detected traveling speed.

3. The apparatus according to claim 1, wherein the vehicle traveling condition detector has a pressure that detects a pressure of air at positions including at least upper and lower positions of the rear of the vehicle, and the drive signal determiner determines the drive signals for the respective air jet devices by retrieving characteristics preset beforehand based on the detected pressure.

4. The apparatus according to claim 2, wherein the air jet devices are installed at positions including upper, lower, right and left positions of the rear of the vehicle, and the vehicle traveling condition detector has a steering angle detector that detects a steering angle of a steering wheel provided at a driver's seat of the vehicle, and the drive signal determiner determines the drive signals for the respective air jet devices by retrieving characteristics preset beforehand based on the detected traveling speed and the detected steering angle.

5. The apparatus according to claim 3, wherein the air jet devices are installed at positions including upper, lower, right and left positions of the rear of the vehicle, the vehicle traveling condition detector has a steering angle detector that detects a steering angle of a steering wheel provided at a driver's seat of the vehicle, and the drive signal determiner determines the drive signals for the respective air jet devices by retrieving characteristics preset beforehand based on the detected pressure and the detected steering angle.

6. The apparatus according to claim 1, wherein the vehicle traveling condition detector has a pressure detector that detects a pressure of air at positions including at least upper and lower positions of the rear of the vehicle, and the drive signal determiner includes a corrector that compares the detected pressures with each other and corrects the drive signals for the respective air jet devices based on a result of comparison.

7. The apparatus according to claim 6, wherein the pressure detector detects the pressure of air after the vibrators of the respective air jet devices have been driven by the determined drive signals.

8. The apparatus according to claim 6, wherein the corrector compares a difference among the detected pressures with a predetermined value and corrects the drive signals for the respective air jet devices based on a result of comparison.

9. A method for reducing vehicle aerodynamic drag equipped with air jet devices installed at positions including at least upper and lower positions of a rear of a vehicle of an almost box-like shape and each having a vibrator connected to a diaphragm disposed in an enclosed region and adapted to be driven based on a drive signal to vibrate the diaphragm to jet/suck air through an orifice formed in the enclosed region, comprising the steps of:
  detecting a traveling condition of the vehicle;
  determining the drive signals for the respective air jet devices independently of each other in terms of at least one of frequency and magnitude based on the detected traveling condition of the vehicle; and
  driving the vibrators of the respective air jet devices based on the determined drive signals to vibrate the diaphragms to jet/suck air through the orifices to reduce aerodynamic drag acting on the vehicle.

10. The method according to claim 9, wherein the step of vehicle traveling condition detecting detects a traveling speed of the vehicle, and the step of drive signal determining determines the drive signals for the respective air jet devices by retrieving characteristics preset beforehand based on the detected traveling speed.

11. The method according to claim 9, wherein the step of vehicle traveling condition detecting detects a pressure of air at positions including at least upper and lower positions of the rear of the vehicle, and the step of drive signal determining determines the drive signals for the respective air jet devices by retrieving characteristics preset beforehand based on the detected pressure.

12. The method according to claim 10, wherein the air jet devices are installed at positions including upper, lower, right and left positions of the rear of the vehicle, and the step of vehicle traveling condition detecting detects a steering angle of a steering wheel provided at a driver's seat of the vehicle, and the step of drive signal determining determines the drive signals for the respective air jet devices by retrieving characteristics preset beforehand based on the detected traveling speed and the detected steering angle.

13. The method according to claim 11, wherein the air jet devices are installed at positions including upper, lower, right and left positions of the rear of the vehicle, the step of vehicle traveling condition detecting detects a steering angle of a steering wheel provided at a driver's seat of the vehicle, and the step of drive signal determining determines the drive signals for the respective air jet devices by retrieving characteristics preset beforehand based on the detected pressure and the detected steering angle.

14. The method according to claim 9, wherein the step of vehicle traveling condition detecting detects a pressure of air at positions including at least upper and lower positions of the rear of the vehicle, and the step of drive signal determining includes the step of:
  comparing the detected pressures with each other and correcting the drive signals for the respective air jet devices based on a result of comparison.

15. The method according to claim 14, wherein the step of vehicle traveling condition detects the pressure of air after the vibrators of the respective air jet devices have been driven by the determined drive signals.

16. The method according to claim 14, wherein the step of comparing compares a difference among the detected pressures with a predetermined value and corrects the drive signals for the respective air jet devices based on a result of comparison.

* * * * *